US011795337B2

(12) United States Patent
Wallace et al.

(10) Patent No.: US 11,795,337 B2
(45) Date of Patent: Oct. 24, 2023

(54) WATER-BASED PIGMENT INKS

(71) Applicant: SUN CHEMICAL CORPORATION, Parsippany, NJ (US)

(72) Inventors: Paul Wallace, Derbyshire (GB); James Matthews, Derbyshire (GB)

(73) Assignee: SUN CHEMICAL COPORATION, Parsippany, NJ (US)

( * ) Notice: Subject to any disclaimer, the term of this patent is extended or adjusted under 35 U.S.C. 154(b) by 0 days.

(21) Appl. No.: 18/040,725

(22) PCT Filed: Dec. 16, 2021

(86) PCT No.: PCT/GB2021/053326
§ 371 (c)(1),
(2) Date: Feb. 6, 2023

(87) PCT Pub. No.: WO2022/129919
PCT Pub. Date: Jun. 23, 2022

(65) Prior Publication Data
US 2023/0242781 A1    Aug. 3, 2023

Related U.S. Application Data

(60) Provisional application No. 63/142,101, filed on Jan. 27, 2021, provisional application No. 63/127,295, filed on Dec. 18, 2020.

(51) Int. Cl.
*C09D 11/322* (2014.01)
*B41M 5/00* (2006.01)
*B41J 2/14* (2006.01)

(52) U.S. Cl.
CPC .............. *C09D 11/322* (2013.01); *B41J 2/14* (2013.01); *B41M 5/0047* (2013.01)

(58) Field of Classification Search
CPC ........ C09D 11/322; B41J 2/14; B41M 5/0047
See application file for complete search history.

(56) References Cited

U.S. PATENT DOCUMENTS

| 6,136,890 A | 10/2000 | Carlson |
| 6,838,521 B2 | 1/2005 | Yoon |
| 8,153,706 B2 | 4/2012 | Vasudevan |
| 8,946,320 B2 | 2/2015 | Guo |
| 10,106,696 B2 | 10/2018 | Liu |
| 2005/0206703 A1 | 9/2005 | Guo |
| 2006/0014856 A1 | 1/2006 | McGorrin |

FOREIGN PATENT DOCUMENTS

| CN | 111 393 569 A | 7/2020 |
| EP | 1396527 B1 | 4/2006 |
| EP | 3063238 B1 | 9/2016 |
| EP | 3380572 B2 | 10/2018 |
| GB | 2 562 311 A | 11/2018 |
| JP | 10330663 A | 12/1998 |
| JP | H11 140365 A | 5/1999 |
| JP | 2000095990 A | 4/2000 |
| JP | 2002 121438 A | 4/2002 |
| JP | 2005 041992 A | 2/2005 |
| JP | 2006 225564 A | 8/2006 |
| JP | 4126589 B2 | 7/2008 |
| JP | 4608854 B2 | 10/2010 |
| JP | 2012036287 A | 2/2012 |
| JP | 5144951 B2 | 11/2012 |
| JP | 6089915 B2 | 3/2017 |
| KR | 20020053332 A | 7/2002 |

OTHER PUBLICATIONS

Cho Y W, New Hexahydro Diazapentacene-based Pigment Synergist Used in Preparation of Pigment Ink Composition, Oct. 30, 2018, Abstract & Equivalent Abstract (Year: 2018).*
International Search Report issued in International Application No. PCT/GB2021/053326, dated Mar. 25, 2022.
Written Opinion of the International Searching Authority issued in International Application No. PCT/GB2021/053326, dated Mar. 25, 2022.
International Preliminary Report on Patentability (Chapter 1 of the Patent Cooperation Treaty) issued in International Application No. PCT/GB2021/053326 dated Oct. 13, 2022.

* cited by examiner

*Primary Examiner* — Lisa Solomon
(74) *Attorney, Agent, or Firm* — Howard Lee; David Lazar; Luke Sande

(57) ABSTRACT

The present invention relates to a printing ink composition comprising a polymer selected from a poly(styrene-maleic acid) co-polymer having an acid number of ≥225 mg KOH/g, a poly(styrene-maleamic acid) co-polymer having an acid number of ≥225 mg KOH/g or a combination thereof, wherein the co-polymer is a lithium, sodium, potassium, ammonium or quaternary ammonium salt or combinations thereof. The printing ink composition is suitable for directly printing onto non-porous substrates particularly without the need for a chemical primer layer or chemical pre-treatment.

21 Claims, No Drawings

WATER-BASED PIGMENT INKS

CROSS REFERENCE TO RELATED APPLICATIONS

The present application is a § 371 National Phase application based on PCT/GB2021/053326 filed Dec. 16, 2021, which claims the benefit of U.S. Provisional Application Nos. 63/127,295 filed Dec. 18, 2020 and 63/142,101 filed Jan. 27, 2021 the subject matter of each of which is incorporated by reference in their entirety.

The present invention relates to water-based inks such as water-based pigment inks that are suitable for inkjet (i.e. digital) printing directly onto non-porous substrates, particularly without the need for a chemical primer layer or chemical pre-treatment of the substrate, and with good jetting and printed image quality, good resolubility, good storage stability and robust film-forming properties. Accordingly, the water-based inks according to the present invention are suitable for use in industrial packaging applications, such as, food packaging applications.

BACKGROUND OF THE INVENTION

Water-based inks that can be inkjet printed directly onto non-chemically treated substrates, preferably plastic substrates such as BOPP (biaxially oriented polypropylene) or PET (poly(ethylene terephthalate)), with good jetting and printed image quality, excellent ink storage stability, long open time, excellent resolubility and robust film forming properties are not known in the art.

US6838521B2 (Sejong University) teaches that polymer materials containing tri-random co-polymers of poly(styrene-acrylic acid), poly(styrene-maleic anhydride) and poly(vinylpyrrolidinone) can be synthesised and used as a dispersant for inkjet inks. The synthesis of such tri-random co-polymers is complex and costly and the manufacture of ink-jet inks in this patent required removal of large particles (presumably insoluble polymers or pigment aggregates) by filtration. There is no evidence in the patent that incorporation of such tri-random co-polymers polymers into inkjet inks provides any advantages over the known art. Furthermore, the ink formulations which are exemplified in US6838521B2 are complex and the binding behaviour of the inks on industrial substrates is not disclosed. Also, the preparation process in this patent is essentially at least three steps, which involves the condensation of poly(maleic anhydride) with at least two other co-polymers, then a milling step to use the tri-random co-polymer as dispersant and finally an ink letdown stage.

JP4126589B2 (Toda Kogyo Corporation) relates to carbon black particles, dispersions and inks only which are prepared from a dispersion containing a di-block co-polymer. This polymer is made from poly(acrylic acid) and poly(styrene-maleic acid). Again, the process to make the inks and polymers is laborious and furthermore the ink formulations derived from this patent are only used for printing onto porous papers for small office, home office use (SOHO). There is no extension of the use of this co-polymer to organic pigments (for example, pigment blue 15) which would indicate that the dispersions and inks derived from the patent are only matched with the dispersant when used with specific grades of the inorganic pigment carbon black.

JP6089915B2 (Toyo Ink) relates to a series of white inkjet ink formulations based exclusively on the inorganic pigment titanium dioxide ($TiO_2$). The dispersants described are prepared from reacting an alpha-olefin with maleic acid or maleic anhydride. Styrene is not mentioned in this patent and there is no teaching about the potential prospect of using styrene-maleic acid as a dispersant, surfactant and binding polymer in an ink. Furthermore, JP6089915B2 is limited to white $TiO_2$-based inks only.

US10106696B2 (Cabot Corporation) relates to inkjet inks for the inorganic pigment carbon black (specifically furnace black) which contain a polymeric dispersant which can be a styrene-maleic acid co-polymer and additionally at least a polyurethane binder and a surfactant. The patent is concerned with carbon black inks for printing onto paper only. It teaches that different types of carbon black pigments can be incorporated into inkjet inks using these types of formulations. In the current invention, the combination of a styrene-maleic acid co-polymer with a polyurethane polymer binder is not required.

JP10330663A (Fujitsu) specifically relates to a carbon black inkjet ink for printing onto paper. An anionic acrylic polymer which has a pH>7, a surface tension <50 dyne/cm and a Mw of <80,000 Daltons is described. In an example, a carbon black ink is prepared from maleic acid-styrene copolymer, carbon black, a defoaming agent, water and diethylene glycol. This ink is directed at printing onto absorbent substrates, specifically paper, which do not need a binder. In the present invention, printing is onto non-absorbent substrates and a binder is required. Furthermore, JP10330663A is concerned with inks for filling cartridges for SOHO use, not industrial use.

KR20020053332A (Cheil Industries) is concerned with the use of various water-soluble polymers including styrene-maleic anhydride copolymer resin, but not styrene-maleic acid resins. Furthermore, the patent relates to a pigment in the form of a dispersion, using one compound from a fatty acid salt, higher alkyl sulfate, higher alcohol sulfate ester salt, quaternary ammonium salt, polyoxyethylene alkyl ester, sorbitan alkyl ester, polyvinyl alcohol, polyvinylpyrrolidone, polyacrylic as the dispersant and then further adding a second polymer into the ink. This document does not teach the use of a co-polymer of styrene-maleic acid as dispersant, binder and surfactant.

JP5144951B2 (The Inctec Inc.) mentions the use of poly(styrene-maleic acid-maleic acid ester) co-polymer as one of a series of anionic polymeric dispersants for pigment inkjet inks. The use of a penetrant liquid, such as glycerol, is required where the weight ratio of glycerol to pigment in the ink is 4-9 and the ratio of the anionic dispersant to pigment is 0.25-0.5. The acid value of the co-polymer is below the minimum acid value of the poly(styrene-maleic acid) co-polymer which is used in the current invention.

US6136890A (Minnesota Mining & Manufacturing Co.) describes the use of a specific polyurethane polymer as the dispersant for pigments. Furthermore, the polyurethane pigment dispersion is incorporated into the ink which is substantially free of organic solvents. This demonstrates that water-based inks, free from additional solvents, can be used with a single polymer as dispersant to place into an inkjet cartridge and print onto paper. It does not cover the industrial use of these inks on non-porous substrates.

EP3380572B2 (Eastman Kodak) describes pigment white ink formulations for printing onto a polymeric binder topcoat. The ink is specifically a white titanium dioxide ink for printing onto photographic coated papers, where the chemically treated paper contains a topcoat with materials that have an affinity for the ink. Styrene-maleic acid co-polymer is described as one of a host of other styrene-based polymers which can be used with titanium dioxide as a pigment dispersant. This patent relates to continuous inkjet printing and for porous, chemically pre-treated papers. There is the optional inclusion of a polyurethane binder in the ink and optional use of hexyloxy benzoic acid polymer as the dispersant.

JP2012036287A (Ricoh) teaches that a poly(styrene-maleic acid) co-polymer can be used as a dispersant and an inkjet ink can be prepared including the pigment dispersion and a water-soluble polyurethane as a binder. We have found there is no additional requirement for a polyurethane binder in the current invention.

EP3063238B1 (DuPont) relates to aqueous inkjet inks which contain at least two different functional polymers. Poly(styrene-maleic acid) is not exemplified as either a dispersing polymer or a binder polymer.

EP1396527B1 (Seiko-Epson) relates to the preparation and use of some complex co-polymers made in turn from other co-polymers. In some cases, poly(styrene-maleic) anhydride or acid can be used as feedstock into the more complex polymer system. In all cases, two different polymer dispersants are used in the ink. The acid values reported for the polymer dispersant materials are either 30-100 mgKOH/g or 100-250 mgKOH/g. In the current invention, we find a higher acid value is key to the success of the invention.

US8153706B2 (HP) is concerned with the use of poly (styrene maleic anhydride) (not acid) and how it is covalently bonded to a dye and a pigment for use in printing inks.

US8946320B2 (HP) teaches that an acid-functionalized pigment can be used in combination with a styrene-maleic anhydride co-polymer in an ink. On further examination, the pigment is actually a reactive dye covalently bound to a functional polymer and this is then dispersed with an acid-functional dispersing agent. There is some reference to styrene-maleic anhydride as a polymer in the ink formulations, but no reference to poly(styrene-maleic acid) as being used as both the dispersant and the binder.

JP4608854B2 (DIC) teaches that poly(styrene-maleic) acid can be used as a dispersant only for pigments.

It is an object of the present invention to address one or more of the problems mentioned above. In particular, it is an object of the present invention to provide a pigment ink formulation which can be inkjet-printed and which displays the characteristics required for a high-performing ink in the industrial inkjet sector, including good jetting and printed image quality, excellent ink storage stability, long open time, excellent resolubility and robust film forming properties, and particularly when the ink formulation is a water-based formulation and suitable for inkjet printing directly onto non-chemically treated substrates, preferably plastic substrates such as BOPP or PET. The inks of the present invention can leverage the same base dispersion technologies and be converted to inks with slightly different physical properties to cover the demands of the industrial printing market.

DETAILED DESCRIPTION

The inventors have developed a series of ink formulations using water—and solvent-water-insoluble pigments (i.e. pigments that are insoluble in a blend of solvent and water), based on a poly(styrene-maleic acid) co-polymer and/or a poly(styrene-malkeamic) acid co-polymer as a dispersant, surfactant and binder which has been used to form the basis of a pigment ink set for inkjet printing. The inks developed are suitable for printing onto low surface energy substrates which have had no chemical pre-treatment, which is unique for water-based inks. A second polymer which is not a poly(styrene-maleic acid) co-polymer and/or a poly(styrene-maleamic) acid co-polymer may optionally be added to modulate the viscoelastic properties of the inks and assist in binding to the substrate. These second polymers are preferably selected from polyacrylic acids, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others.

There are many current challenges with the future generations of water-based pigment inks for printing onto non-porous (and also porous) substrates. The challenges are both physical, chemical and physico-chemical. From the perspective of the printing press and printer maintenance, the inks must give excellent jetting performance from the print heads; long open times (in the event the printing heads are not capped appropriately) which have a quick start-up; good resolubility in the case that inks are left to dry out in the machine and the machine can be flushed and recovered; and do not settle during operation of the printer when ink re-circulating systems are being used. In terms of the ink and the substrate interactions, the inks must bind well to the substrates, preferably without the need for chemical pre-treatments or chemical primers. In general, it is common practice in the inkjet industry for most substrates to be "de-greased" prior to printing using a corona treatment on-line or off-line. The color of the inks must be vibrant, and the inks when bound to the surface must be able to withstand a multitude of physical tests such as adhesion, scratch resistance, alcohol rub resistance, water resistance and crinkling/warping tests. Furthermore, the inks should be capable of printing on the top of base color coats, have top color coats printed on top of them and be able to withstand various lamination processes.

To this end, the present inventors have developed the use of a single polymer as dispersant and surfactant, preferably as dispersant, surfactant and binder in an inkjet formulation, to generate a series of inks which meet all the criteria noted above.

The present invention provides a printing ink composition comprising a polymer selected from a poly(styrene-maleic acid) co-polymer having an acid number of ≥225 mg KOH/g, a poly(styrene-maleamic acid) co-polymer having an acid number of ≥225 mg KOH/g or a combination thereof, wherein the co-polymer is a lithium, sodium, potassium, ammonium or quaternary ammonium salt, or combinations thereof.

Preferably, the composition comprises a single polymer type. As used herein, the term "single polymer type" means all the polymers in the ink belong to the same class, e.g. they are all poly(styrene-maleic acid) co-polymers and/or poly (styrene-maleamic acid) co-polymers as defined herein. Accordingly, in a preferred embodiment, no additional polymer types (e.g. a polyurethane) are required in the ink used in the present invention. As defined herein, poly(styrene-maleic acid) co-polymers and poly(styrene-maleamic acid) co-polymers belong to the same class, i.e. together they are a single polymer type.

Preferably, the ink composition according to the present invention further comprises one or more colorants; water; and at least one organic co-solvent. Preferably, the one or more colorants is a pigment.

The present invention also provides a water-based pigment ink set comprising at least a pigment colorant, a poly(styrene-maleic acid) co-polymer and/or a poly(styrene-maleamic acid) co-polymer, water, an organic solvent and optionally an additional surfactant. The water-based pigment inks are suitable for inkjet printing directly onto non-chemically pre-treated substrates. Preferably, the substrates are non-porous.

The present invention also provides a method for printing comprising applying the ink composition of the invention onto a substrate and curing. Preferably, the method of printing is inkjet printing.

The present invention also provides a method for the decoration of a substrate or film, typically a thin plastic material (e.g. less than 500 µm, particularly less than 250 µm) with very low Tg (e.g. 40-60° C.), by contacting a substrate with a water-based ink according to the invention and subsequently fixing the said water-based ink onto said substrate using near infrared (NIR) radiation. Alternatively, the present invention also provides a method for the decoration of metal, by contacting a substrate with a water-based ink according to the invention and subsequently fixing the said water-based ink onto said substrate using heat curing.

The present invention also provides a method of printing an image on a non-porous substrate by inkjet printing, wherein said method comprises applying a water-based inkjet ink composition onto a non-porous substrate, wherein said inkjet ink composition comprises a poly(styrene-maleic acid) co-polymer having an acid number of ≥225 mg KOH/g and/or a poly(styrene-maleamic acid) co-polymer having an acid number of ≥225 mg KOH/g.

The present invention also provides use of a water-based ink composition comprising a poly(styrene-maleic acid) co-polymer and/or a poly(styrene-maleamic acid) co-polymer as an inkjet ink composition for printing an image on a non-porous substrate by inkjet printing, wherein said poly(styrene-maleic acid) co-polymer or poly(styrene-maleamic acid) co-polymer has an acid number of ≥225 mg KOH/g.

The present invention also provides a method for preparing the water-based ink of the invention, comprising the steps of:
  i. Preparing a pigment dispersion by mixing a pigment powder together with at least poly(styrene-maleic acid) or poly(styrene-maleamic acid) as a dispersant, deionised water, and milling the slurry until the required particle size is obtained; and preferably the individual pigment or colorant dispersions can be subjected to milling to liberate a pigment or colorant dispersion which is stable and the pigment particles having an average particle size (Z-average) of between 100 nm and 250 nm, as determined by ISO 13320:2009(E); and
  ii. adding water, an organic solvent and optionally other chemical agents to said dispersions, thereby obtaining water-based inks.

The present invention also provides a method for printing a variety of different substrates, comprising the steps of:
  i. Applying a water-based ink according to the invention onto the substrate; and
  ii. fixation of said water-based ink onto said substrate using NIR-radiation or thermal curing.

A decorated substrate which is formed from the deposition of an ink incorporating a poly(styrene-maleic acid) co-polymer and/or a poly(styrene-maleamic acid) co-polymer, whereby said substrate can be printed with at least one or more inks and cured by either a serial arrangement of NIR lamps or thermally cured using a thermal heating device.

The present invention also provides a printed film comprising or derived from the ink composition of the invention.

The present invention also provides use of a series of aqueous pigment inks for printing onto rigid and flexible substrates that enables high line speed digital decoration of said substrates with superior print quality.

The present invention is advantageous for any one or more of the following:

A single polymer type, namely a poly(styrene-maleic acid) co-polymer and/or poly(styrene-maleamic acid) co-polymer can be used as the dispersant, surfactant and binder in a digital ink. The use of a single polymer type provides a simpler ink that is suitable for use in industrial inkjet printing.

The inks exhibit good adhesion properties with a surprisingly low level of polymer solids. Typically, finished inks known in the art require ≥10% polymer solids, whereas the inks of the present invention specifically based on only poly(styrene-maleic acid) co-polymer(s) and/or poly(styrene-maleamic acid) co-polymer(s) preferably contain 0.5-5% polymer solids; more preferably 0.5-4%, more preferably 0.5-3.25%; and most preferably 0.5-3.2% or 0.6-3.1%.

The acid number (i.e. acid value) of the poly(styrene-maleic acid) co-polymer and/or poly(styrene-maleamic acid) co-polymer is outside the range of polymers typically found in inkjet printing inks, namely ≥225 mg KOH/g, preferably ≥255 mg KOH/g, which contributes to good ink resolubility.

The inks exhibit good adhesion without the need for a chemical primer layer or chemical pre-treatment of the substrate.

The inks exhibit good resolubility and good film forming properties without the need for a crosslinker or second polymer type in the ink.

Further advantages of the inks of the present invention are that they are preferably water-based and can be printed onto a diverse number of different substrates directly (i.e. without the need for a chemical primer or chemical pre-treatment layer on the substrate). Indeed, it is quite surprising to be able to print a water-based inkjet ink onto a plastic substrate such as BOPP or PET that has not been chemically treated with good jetting and printed image quality, excellent ink storage stability, long open time, excellent resolubility and robust film forming properties. Furthermore, reliability in the printing press is important. The inks according to the invention display excellent resolubility and open time, meaning the printing press can be used for longer periods without any need for preventative maintenance.

Ink Additives: The polymeric dispersing agent used in the present invention is a co-polymer or block co-polymer having hydrophilic and hydrophobic functionality incorporated within it. The polymeric dispersing agent class in the present invention is advantageously poly(styrene-maleic acid) co-polymers and/or poly(styrene-maleamic acid) co-polymers (which belong to the same polymeric class), wherein the co-polymers are lithium, sodium, potassium, ammonium or quaternary ammonium salts, or combinations thereof.

As will be understood in the art, poly(styrene-maleic acid) co-polymers comprise styrenic and maleic acid repeating units. Similarly, poly(styrene-maleamic acid) co-polymers comprise styrenic and maleamic acid repeating units. As will be further understood in the art, the acidic groups in maleic acid and maleamic acid can form salts with an appropriate neutralizing agent.

Preferably, the maleic acid or maleamic acid repeating unit in the co-polymer is a mono-sodium salt, a di-sodium salt, a mono-ammonium salt, a di-ammonium salt, a mono-quaternary ammonium salt or a di-quaternary ammonium salt.

Preferably, the poly(styrene-maleic acid) co-polymer or poly(styrene-maleamic acid) co-polymer is selected from a di-sodium salt of poly(styrene-maleic acid) co-polymer, a di-ammonium salt of poly(styrene-maleic acid) co-polymer, a mono-ammonium salt of poly(styrene-maleamic acid) co-polymer, a mono-quaternary ammonium salt of poly (styrene-maleamic acid) co-polymer or combinations thereof.

Preferably, the poly(styrene-maleic acid) co-polymer and poly(styrene-maleamic acid) co-polymer do not contain any maleic anhydride residues.

Preferably, the poly(styrene-maleic acid) co-polymer and poly(styrene-maleamic acid) co-polymer do not contain any maleic ester residues.

Preferably, the poly(styrene-maleic acid) co-polymer and poly(styrene-maleamic acid) co-polymer comprise 5 to 50% by weight, preferably 15 to 40% by weight maleic acid or maleamic acid content.

Preferably, the poly(styrene-maleic acid) co-polymer is a solution-soluble poly(styrene-maleic acid) co-polymer. As is understood in the art, the term "solution-soluble" co-polymer (e.g. a solution-soluble poly(styrene-maleic acid) co-polymer, and also known as an alkali-soluble polymer or a solution-polymer) typically refers to co-polymers that comprise acidic groups (including acid derivatives such as anhydrides) as part of the monomer blend. When the carboxylic acid groups of the polymer are neutralized with a base the polymers can then be dissolved in water to form an aqueous solution.

Examples of suitable poly(styrene-maleic acid) co-polymers and poly(styrene-maleamic acid) co-polymers include, but are not limited to poly(styrene-alt-maleic acid) sodium salt solution from Merck; SMA 1000 H, SMA 1000 HNa, SMA 2000 H, SMA 2000 HNa, SMA 3000 H, SMA 3000 HNa, SMA 1000 AMP, SMA 2000 AMP and SMA 3000 AMP from Polyscope Polymers. Further examples of suitable poly(styrene-maleic acid) co-polymers and poly(styrene-maleamic acid) co-polymers include Xiran 3000 HNa, Xiran 1000 A, Xiran 2000 A, Xiran 1550 H and Xiran 3000 H from Polyscope Polymers.

Preferably, the ink compositions comprise styrene-maleic acid co-polymer in an amount of 0.05-10 wt %, preferably 0.1 to 5wt %.

Preferably, the poly(styrene-maleic acid) co-polymers or poly(styrene-maleamic acid) co-polymers have a molecular weight of ≥3,000 Daltons, preferable ≥3,500 Daltons. Preferably, the poly(styrene-maleic acid) co-polymers or poly (styrene-maleamic acid) co-polymers have a molecular weight of 3,000-20,000 Daltons, preferably 3,500-15,000 Daltons.

In some embodiments, the ink compositions may be, but are not limited to, inkjet ink compositions that can optionally include one or more additives that are compatible with the other components of the composition. Additives can be included in the composition to impart any number of desired properties, including, but not limited to, stability, smear resistance, viscosity, surface tension, coating penetration, optical density, color depth, adhesion, highlighter resistance, resolubility and crust resistance, among others. Suitable additives for such uses and the amounts of such additives used are known and conventionally used in the art.

Examples of additives include, but are not limited to, defoamers, preservatives, surfactants, pH modifiers, viscosity modifiers, humectants, penetrating agents, and additional polymers, among others.

In some embodiments, defoamers can be included in the ink composition, to inhibit the formation of foam. Examples of suitable defoamers include, but are not limited to, silicone-based or non-silicone defoamers. Commercially available defoamers include, but are not limited to, Dow Coming® 71 and Dow Coming® 74 (from Dow Corning), TegoAirex® 901 W, 902 W, 904 W from Evonik Industries/ Tega, Tergitol® L-61, L-62, L-64 and L-101 (from Dow Chemical). A typical amount (by weight) of defoamer included in the composition is 0.1 to 3% by weight.

In some embodiments, preservatives, such as biocides and fungicides, can be included in the ink composition to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3,5,7-tri-aza-1azoniaadamantane chloride (CTAC), methylisothiazolinone, and chloromethylisothiazolinone, among others. Commercially available biocides include UCARCIDE® 250 (available from Union Carbide Company), Proxel® CRL, Proxel® BDN, Proxel® GXL, Proxel®XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). Agitan 731 biocide and Acticide M10 biocide may also be used. The preservatives may be used alone or in combination. A typical amount (by weight) of preservative included in the composition is 0.05 to 2% by weight, preferably 0.1 to 1.5% by weight.

In alternative embodiments, additional surfactants can be included to reduce surface tension of the ink composition. The additional surfactant can be an anionic surfactant, non-ionic surfactant or cationic surfactant. Suitable surfactants can include, but are not limited to, those listed below and in US. Pat. No. 5,116,409, US. Pat. No. 5,861,447 and US. Pat. No. 6,849,111. Exemplary surfactants are commercially available under various trade names, such as the PLURONIC® series (BASF Corporation, Parsippany, N.J.), TETRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), and ETHOMEEN® series (Akzo Chemical Inc., Chicago, Ill.), among others. The surfactants can be used alone or in combination. A typical amount (by weight) of additional surfactant included in the composition is 0.1 to 10% by weight.

As used herein a surfactant is an agent that lowers the surface tension between two substances (e.g. two liquids, a gas and a liquid or a liquid and a solid), whereas a wetting agent lowers the interfacial tension of water allowing it to spread on a solid surface. In a preferred embodiment of the invention, the ink composition does not comprise any additional surfactants (i.e. other than the poly(styrene-maleic acid) or poly(styrene-maleamic acid) co-polymer) but may comprise a wetting agent, for example a polyether siloxane co-polymer such as Tego Wet KL 245 (Evonik).

In some embodiments, pH modifiers can be included to adjust or buffer the ink composition to a desired pH. Suitable pH modifiers include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A typical amount (by weight) of pH modifier in the composition is 0.1 to 2% by weight.

In some embodiments, the ink compositions can include one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. The viscosity modifiers can be used alone or in combination. A typical amount (by weight) of viscosity modifier in the composition is 0.5 to 10% by weight.

In some embodiments, in addition to an organic cosolvent of the fluid carrier component which can function as a humectant, one or more additional humectants can be included in the inkjet ink composition to reduce the rate of evaporation of the water component and prevent an ink composition from drying out in the nozzles of the printhead, which can occur during periods of latency, to minimize clogging of the nozzles. Humectants may be selected from materials having high hygroscopicity and water-solubility. Examples of suitable humectants include, but are not limited to, polyols (e.g., ethylene glycol, monopropylene glycol, dipropylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A typical amount (by weight) of humectant in the composition is 0.5 to 30% by weight.

The ink compositions according to the present invention are advantageous in that a single polymer, namely poly (styrene-maleic acid) or poly(styrene-maleamic acid) co-polymer, can function as dispersant, surfactant and binder. Accordingly, no additional polymers are required in the ink composition. Nonetheless, in some embodiments, the ink composition can optionally include additional polymers (other than the poly(styrene-maleic acid) co-polymer) to enhance water-fastness, rub and light fastness of an ink image applied to and dried on a print substrate. Examples of such polymers include, but are not limited to, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. A typical amount (by weight) of such additional polymers that can be included in the composition is 0.1 to 20% by weight.

Preferably, the printing ink compositions according to the present invention do not include a polyurethane polymer.

In some embodiments, the ink composition can optionally include a self-crosslinking polymer to improve the durability of an ink image applied to and dried on a print substrate. Examples of such self-crosslinking polymers for use in the ink compositions include, but are not limited to, self-crosslinking acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition is 0.1 to 20% by weight.

Other additives that can be included in the ink compositions include, but are not limited to, antioxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Colorants: Suitable colorants that can be used in the ink composition of the invention include any inorganic and organic pigments and lake dispersions. Pigments refer to a colorant particle that is typically water insoluble. As used herein water—and/or water-solvent-insoluble pigments are insoluble at 25° C.

Suitable pigments that can be used to form the ink compositions disclosed herein may include any organic or inorganic pigment known in the art, including, but not limited to, black, yellow, orange, brown, red, violet, blue, green, fluorescent, metal powder and polymer bond pigments. Pigments also may include, but are not limited to, carbon black, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, ovaine lake pigments, metal complex pigments, natural pigments, and inorganic pigments, among others. The pigment particles should be sufficiently small (i.e. have an average particle size of from about 100 nm to about 250 nm) to permit free flow of the ink through the ejecting nozzle of an inkjet printing device.

Suitable colored pigments can include, for example, yellow pigments such as C. 1. Pigment Yellow 1, 2, 3, 4, 5, 6, 10, 12, 13, 14, 16, 17,24, 55, 61, 65, 73, 74, 81, 83, 93, 94, 95, 97, 99, 100, 108, 109, 110, 117, 120 ,123, 124, 128, 129, 133, 138, 139, 147, 150, 151, 153, 154, 155, 156, 167, 168, 172, 173, 174, 175, 176, 177, 179,1 80, 181, 182, 183, 184, 185, 187, 188, 190,191, 192, 193, 194 among others; red pigments such as, C. 1. Pigment Red 1, 2, 3, 4, 5, 6, 7, 8, 9, 10, 11, 12, 13, 14, 15, 16, 17, 18, 19 ,21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261 and 264 among others; violet pigments such as C. 1. Pigment Violet 1, 2, 3, 5, 13, 19, 23, 25, 27, 29, 31, 32, 37, 39, 42, 44 and 50 among others; blue pigments such as C. 1. Pigment Blue 1, 2, 3, 9, 10, 14, 15, 16, 18, 19,21, 22, 24, 25, 56, 60, 61, 62, 63, 64, 65, and 66, among others; orange pigments such as C. 1.

Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, and 69 among others; green pigments such as C. 1. Pigment Green 1, 2, 4, 7, 8, 10, 34, 36, 45, and 47, among others; brown pigments such as C. 1. Pigment Brown 1, 2, 3, 5, 22, 23, 25, 26, 32, 38, 41, and 42 among others; black pigments such as C. 1. Pigment Black 1, 7, 20, 31, and 32 among others, and white pigments such as titanium dioxide. Commercially available colored pigments may include, for example, Pigment Red 122 and Pigment Violet 19 (available from Lansco Colors, Montvale, N.) or BASF Color, Charlotte, NC. or Clariant Colors, Charlotte, N.C. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, NC. or Clariant Colors, Charlotte, NC. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable pigments can also include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black can be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (N1Pex® 150 IQ, N1Pex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, N1Pex® 160 IQ, Nipex® 1701Q, Nipex® 1801Q, N1Pex® 90, Special black 4, Special black 4A, Special black 5, Special black 6, Special black 100, Special black 250, Color black FW1, Color black FW2, Color black FW2V, Color black FW18, Color black FW200, Color black $150, Color black $160 and Color black S170), Columbian/Birla Carbon (Raven® 780, Raven® 5000 Ull, Raven® 1255, Raven® 2500 U, Raven® 3600 U, Raven® 3500, Raven® 5000, Raven® 7000, Raven® 1220 and Raven® 1225), Mitsubishi Kagaku K. K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonjet Black CW-1, US 2018/0105710A1 Bonjet Black CW-2, and Bonjet Black CW-3) and Sensient Technologies (Sensijet® Black SDP100, Sensijet® Black SDP1000, and Sensijet® Black SDP2000.

In some embodiments, the pigment can be self-dispersing in a selected continuous phase. Self-dispersing pigments are pigments that do not require an additional dispersant for being stable within a polymer composition. In embodiments, a self-dispersing pigment is a pigment that has been functionalized with a dispersing agent such as a molecule containing a hydrophilic functional group, for example, by covalent bonding of the molecule to the surface of the pigment.

In some embodiments, the amount (by weight) of the colorant in the inkjet ink compositions is at least 0.1, such as at least 0.5, at least 1, at least 1.5, and at least 2% by weight. In embodiments, the amount of the colorant is at most 10, such as at most 9, at most 8, at most 7, at most 6, and at most 5% by weight. This includes embodiments in which the amount of the colorant in the compositions is 0.1 to 10% by weight, such as 2 to 5% by weight.

Preferably, the ink compositions comprise a poly(styrene-maleic acid) or poly(styrene-maleamic acid) co-polymer and pigment in a weight ratio of from about 20:1 to about 1:20, preferably from about 10:1 to about 1:10, more preferably from about 5:1 to about 1:5.

A colorant used in the inventive inkjet ink compositions can comprise one or more embodiments described herein.

Fluid Carrier: The inkjet ink compositions preferably comprise a fluid carrier which comprises water and one or more organic co-solvents, which can be water-soluble organic co-solvents, water-miscible organic co-solvents, or a combination thereof. The organic co-solvents can be used either alone or in combination.

In some embodiments, the organic co-solvents are humectants, which can reduce the rate of evaporation of the water component and prevent an ink composition from drying out or crusting in the nozzles of the printhead to minimize clogging of the nozzles. In embodiments, the organic co-solvents can enhance solubility of the components in the inkjet ink composition and facilitate penetration of a printed ink composition into a substrate.

Suitable water-soluble and water-miscible organic solvents include, but are not limited to, alcohols (e.g., methanol, ethanol, propanol, isopropyl alcohol, butanol, polyols, ethylene glycol, propylene glycol (i.e. monopropylene glycol), dipropylene glycol, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl-2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others). Preferably, the organic co-solvent is propylene glycol and/or dipropylene glycol.

In some embodiments, the amount (by weight) of the organic co-solvent in the inkjet ink composition is at least 1, such as at least 5, and at least 10, % by weight. In some embodiments, the amount (by weight) of the organic cosolvent is at most up to about 80, such as at most 70, at most 60, and at most 50, % by weight. This includes embodiments in which the amount of the organic co-solvent in the composition is 1 to up to about 80% by weight, such as 10 to 50% by weight.

An organic co-solvent used in the inventive ink compositions can comprise one or more embodiments described herein.

Preferably, the inks according to the present invention are water-based. Unless stated otherwise, water-based inks comprise at least 20, preferably at least 25, and more preferably at least 30% by weight water. In embodiments the amount (by weight) of water is at most 95, at most 85, at most 80, at most 75, at most 70, at most 65, and at most 60, % by weight. This includes embodiments in which the amount of water in the composition is 20 to 95% by weight, such as 20 to 80, and 30 to 70, % by weight. The range of water in the composition is typically 30 to 75% by weight, and more typically 30 to 60% by weight.

Preparation of Inkjet Ink Compositions: The invention also provides methods of preparing the inkjet ink compositions disclosed herein. In some embodiments, the inkjet ink compositions of the invention can be prepared by mixing a dispersion of a pigment in water and a poly(styrene-maleic acid) or poly(styrene-maleamic acid) dispersant with at least an organic solvent, further quantities of a poly(styrene-maleic acid) co-polymer or poly(styrene-maleamic acid) co-polymer and a biocide.

In some embodiments, the inkjet ink composition can also be prepared by mixing a pigment in water and a poly(styrene-maleic acid) or poly(styrene-maleamic acid) dispersant with at least an organic solvent, fluid carrier, an optional crosslinking agent, and optional additives.

In some embodiments, the fluid carrier can be prepared by combining one or more water-soluble organic co-solvents, one or more water-miscible organic co-solvents or a mixture thereof, with water, which can be combined with the other components of the composition. In some embodiments, the organic co-solvent(s) and water of the fluid carrier can be combined directly with the poly(styrene-maleic acid) or poly(styrene-maleamic acid) co-polymer, colorant(s), optional crosslinking agent and optional additives.

An ink composition according to the invention can comprise a combination of two or more embodiments described herein.

The water-based inks are prepared in the normal manner. A dispersion of the pigment can be prepared in the traditional manner using high shear mixing to form a concentrate pre-mix and then milling. Normally, the carrier liquid, which can be water, or another solvent liquid, is mixed under high shear conditions with a dispersing agent and a wetting agent whilst a powder of the pigment is added. The resulting mixture is typically mixed under high shear conditions for a short time before charging to a bead mill, for example a Netzsch or Buhler mill. The suspension is milled for a fixed time until the desired particle size of the dispersion is reached—typically 100-150 nm (Z-average particle size). At this time, the dispersion is usually discharged from the mill through a filter cartridge into a holding or storage vessel. The dispersions can be made separately, or the two pigments can be combined as powders at the start and essentially co-processed together through the high shear mixing and milling phases.

The ink is prepared in the normal manner for an aqueous pigment ink. To the stirred liquid comprising water is added the co-solvents, or vice versa. The colorant dispersion(s) are then added slowly, and the other components of the ink are then added—this may be components such as biocides or preservatives, binders, polymers, resins, surfactants, wetting agents and small quantities of other co-solvents. The ink is pumped under positive pressure through a cartridge filter and packed.

Methods of Printing: The invention further includes methods of printing an image on a substrate by applying an inkjet ink composition according to the invention onto the substrate. In embodiments, the inkjet ink compositions disclosed herein are adapted for use with an inkjet printing apparatus.

In an embodiment of a method of printing an image, droplets of an inkjet ink composition as disclosed herein are ejected from a small nozzle of a printhead and deposited onto a print substrate to generate an image thereon. Suitable inkjet ink printing apparatus can include, but are not limited to, Drop-on-Demand Valve (DoD Valve), MEMS technology and Drop-on-Demand PiezoElectric (DoD Piezo).

Examples of suitable print substrates to which this invention is particularly directed include, but are not limited to, transparency materials, metals, ceramics, glass, plastics, synthetic polymer films and inorganic substrates, among others. Preferably, the substrate is non-porous. The substrates of particular suitability for the present invention are preferably selected from polymeric films such as BOPP (Biaxially Oriented PolyPropylene), Cellophane (cellulose), LDPE/HDPE (low and high density polyethylenes), OPP (Orientated polypropylene), MET-OPP (Metalized Orientated Polypropylene), PA (polyamide, Nylon), PET (Polyethylene Terephthalate), MET-PET (Metalized Polyethylene Terephthalate), PP (polypropylene) and PVC (Polyvinyl Chloride). Suitable metal substrates for the present invention include steel (including protected steel) and aluminium (including protected aluminium).

Preferably, the substrate used in the present invention does not contain a chemical primer or chemical pre-treatment layer on its surface, and so the ink is printed directly onto the substrate. As will be understood in the art, a chemical primer layer is an intermediary layer between the substrate and the ink that facilitates adhesion between the substrate and the ink. Similarly, it will be understood in the art that chemical pre-treatment of a substrate involves applying a chemical substance to the substrate before printing which binds to the substrate and which facilitates adhesion between the substrate and the ink.

As will be understood in the art, a chemical primer or chemical pre-treatment is distinct from a physical pre-treatment of the substrate. Accordingly, the substrate suitable for use in the present invention may be subjected to a physical pre-treatment prior to being printed, for example a plasma pre-treatment. As will also be understood in the art, a chemical primer or chemical pre-treatment for adhesion promotion is distinct from a passivating protective layer on the substrate, for instance for the purpose of corrosion resistance. Accordingly, the substrate may comprise a passivating protective layer, for instance as is present in protected steel. As is understood in the art, metal substrates are typically protected to prevent corrosion and protection may involve galvanising the metal (e.g. steel) with a layer of a zinc before printing on the substrate.

The inkjet ink compositions are formulated to have properties that allow for at least one of the following: 1) uniform, bleed-free print images with high resolution and high density on a print substrate; 2) inhibition or prevention of nozzle clogging which typically occurs due to drying of the ink at a distal end of a nozzle of the printing apparatus; 3) rapid drying on a print substrate (film, etc.); 4) long-term storage stability; and 5) print characteristics that are independent of the print substrate quality. The inkjet ink compositions can also provide ink stability and robustness against fluctuating temperature conditions which can occur during transport and storage, to eliminate or inhibit nozzle clogging, banding, and poor print quality.

The inkjet ink compositions disclosed herein are adapted specifically for use in packaging articles and films printing processes. In embodiments, the inkjet ink compositions adapted for packaging printing can be formulated to have at least one of the following properties: 1) fastness to plastic films such as BOPP (Biaxially Oriented PolyPropylene), Cellophane (cellulose), LDPE/HDPE (low and high density polyethylenes), OPP (Orientated polypropylene), MET-OPP (Metalized Orientated Polypropylene) PA (polyamide, Nylon), PET (Polyethylene Terephthalate), MET-PET (Metalized Polyethylene Terephthalate), PP (polypropylene) and PVC (Polyvinyl Chloride) or blends of the same ; and 2) ease of application and fixation to the packaging substrate. As will be understood in the art, the plastic films described above are non-porous.

The ink is then suitable for use in an industrial high-speed digital printing press for the decoration of plastic and other films (for example, metal foils). On printing the films, with the combination of the black ink, and standard inks of other colours comprising at least Cyan, Magenta and Yellow, and may also include, but not limited to spot colours such as Red, Orange, Violet and Green, the sequence of printing by digital means the separate colours and drying the resulting deposited wet inks by Near Infra-Red lamps at full power, enables the printing press to run at full speed and results in no deformation of the printed films. The end result is a very high productivity and a very high final print quality.

Measurement Methods

Acid Value (AV): Acid value (or acid number) is defined as the mass of potassium hydroxide (KOH) in milligrams that is required to neutralize one gram of chemical substance. The acid value is suitably measured in accordance with the ISO 2114:2000(E)(method B) standard.

Particle Size/Average Particle Size: Unless stated otherwise, the terms "particle size" or "average particle size" refer to the Z-average i.e. the harmonic mean from the intensity-weighted distribution as measured by dynamic light scattering (DLS), as defined in ISO 22412:2008.

Nanoscale: In the context of the invention this refers to a particle having one dimension of less than 100 nm, a commonly accepted definition of a nanoparticle.

Polydispersity: Polydispersity (or polydispersity index) as used herein is a measure of the heterogeneity of a sample based on particle size. Unless stated otherwise, polydispersity was measured using a using a Malvern Zetasizer Nano-S particle size analyzer from Malvern Instruments.

Glass Transition Temperature (Tg): Tg is measured by differential scanning calorimetry (DSC). Preferably, measurements were made according to the following standard test method and based on the method described in ASTM E1356-98. The sample was maintained under an atmosphere of dry nitrogen for the duration of the scan. A flow rate of 20 ml/min and Al pans were used. Samples (5 mg) were heated at 20° C./min from 20° C. to 350° C. The value of a Tg was determined as the extrapolated onset temperature of the glass transition observed on the DSC scans (heat flow (W/g) against temperature (° C.)), as described in ASTM E1356-98.

Molecular Weight: The terms "molecular weight" or "average molecular weight" is a reference to the weight average molecular weight (Mw). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, Mass., USA) and THF as mobile phase. The skilled person will appreciate that this definition of molecular weight applies to polymeric materials which typically have a molecular weight distribution.

Unless stated otherwise, the viscosities of the inks were measured using a Brookfield DV-II+ Pro Viscometer equipped with an Enhanced Brookfield UL Adapter at 60 rpm and 25° C.

Unless stated otherwise, pH and conductivity were measured at 25° C. using an Oakton 510 series pH/conductivity meter.

Unless stated otherwise, dynamic surface tension is measured using a SITA bubble pressure tensiometer at 25° C. and 2.7 Hz and static surface temperature is measure using a SITA bubble pressure tensiometer at 25° C. and a bubble frequency of 0.025 Hz.

The invention is further described by the following numbered paragraphs:

1. Printing ink compositions comprising a single polymer type that is a solution soluble poly(styrene-maleic acid) (SMA) co-polymer.

2. The composition of paragraph 1, further comprising one or more colorants; water; and at least one organic co-solvent.

3. The composition of any preceding paragraph, which is an inkjet ink suitable for deposition through at least a single nozzle.

4. The composition of any preceding paragraph, comprising 0.5-5% SMA polymer solids; more preferably 0.5-4%, more preferably 0.5-3.25%; even more preferably 0.5-3.2%, and most preferably 0.6-3.1%.

5. The composition of any preceding paragraph, further comprising one or more non-SMA polymers selected from the group consisting of polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, and combinations thereof.

6. The composition of any preceding paragraph, wherein the acid number of the poly(styrene-maleic acid) polymer(s) is preferably ≥200 mg KOH/g, more preferably ≥225 mg KOH/g, and most preferably ≥250 mg KOH/g.

7. The composition of any preceding paragraph, wherein the acid number of the poly(styrene-maleic acid) polymer(s) is 200-600 mg KOH/g, more preferably 225-550 mg KOH/g, and even more preferably 250-550 mg KOH/g.

8. The composition of any preceding paragraph, wherein the counterions which are present in the poly(styrene-maleic acid) co-polymers are selected from a group consisting of lithium, sodium, potassium, ammonium, hydrogen, quaternary ammonium salts of organic amines and combinations thereof.

9. The composition of paragraph 8, wherein the quaternary ammonium salts of organic amines are selected from the group consisting of primary, secondary and tertiary aliphatic amines or hydroxyl—or alkoxyl amines and combinations thereof.

10. The composition of any preceding paragraph, comprising 0.1-7.5 wt % of a pigment, 0.1-5 wt % of a styrene-maleic acid co-polymer, 2-30 wt % of an organic solvent and the remainder of the formulation deionised water.

11. The composition of any preceding paragraph, wherein a dispersion of a pigment powder is prepared initially using the poly(styrene-maleic acid) as dispersant and surfactant.

12. The composition of paragraph, 11, wherein the pigment particles are dispersed using a milling process or a kneading process.

13. The inks of paragraph 11, wherein the pigment particles are grown and concomitantly dispersed using a continuous hydrothermal flow synthesis (CHFS) method.

14. The composition of any preceding paragraph, wherein the pH of the ink is 7.0-10.5, more preferably 7.5-10.0 and even more preferably 8.0-9.5.

15. The composition of any preceding paragraph, having a static surface tension of <40 dyne/cm, more preferably <36 dyne/cm and even more preferably <35 dyne/cm.

16. The composition of any preceding paragraph, having a dynamic surface tension of <47 dyne/cm at 2.7 Hz, more preferably <42 dyne/cm and even more preferably <40 dyne/cm.

17. The composition of any preceding paragraph, further comprising a surfactant.

18. The composition of paragraph 17, wherein the surfactant is selected from the group consisting of anionic, cationic or neutral.

19. A method for printing, comprising applying any one or more of the composition of paragraphs 1-18 onto a substrate and curing.

20. The method of paragraph 19, wherein the method of printing is inkjet.

21. The method of paragraph 20, wherein the line speed of the printing press is between 50-600 m/minute (linear), more preferably 100-400 m/min and even more preferably 150-300 m/min 22. The method of any one or more of paragraphs 19-21, wherein the substrate is selected from the group consisting of BOPP (Biaxially Oriented PolyPropylene), Cellophane (cellulose), LDPE/HDPE (low and high density polyethylenes), OPP (Orientated polypropylene), MET-OPP (Metalized Orientated Polypropylene) PA (polyamide, Nylon), PET (Polyethylene Terephthalate), MET-PET (Metalized Polyethylene Terephthalate), PP (polypropylene), aluminium foil, aluminium pharmaceutical foil, steels, copper, protected metals and PVC (Polyvinyl Chloride).

23. The method of any one or more of paragraphs 19-22, wherein the substrates do not contain a chemical primer or chemical pre-treatment layer.

24. The method of any one or more of paragraphs 19-23, wherein the ink is cured using a near infrared (NIR) lamp or infrared lamp.

25. The method of any one or more of paragraphs 19-24, wherein the ink is cured using a thermal method at between 30-250° C.

26. The method of any one or more of paragraphs 21-25, wherein the ink is cured using an airflow method.

27. The method of any one or more of paragraphs 21-28, comprising an inkjet printing head selected from the group consisting of thermal, drop-on-demand, continuous or MEMs.

28. A printed film comprising one or more of the compositions of paragraphs 1-18.

29. The printed film of paragraph 28 which are compliant with use in food contact and pharmaceutical foil applications.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Example 1

Cyan Dispersion and Inks

1a. Cyan Dispersion (3.69% poly(styrene-maleic acid) polymer solids): To a mechanically stirred tank or vessel is added 44.98 kg of deionised water (conductivity less than 25 microSiemens) and 14.74 kg of Xiran 3000 HNa solution (poly(styrene-maleic acid) in water at 25% polymer solids, acid number 255-305 mg KOH/g and molecular weight 10 kD) and the two components mixed using stirring for a few minutes. Agitan 731 biocide (0.15 kg) and Acticide M10 biocide (0.07 kg) are then added with continual stirring of the mixture. The pigment powder, Heliogen Blue D 7086, 14.74 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 25.32 kg of deionised water is added. After mixing for a few minutes, the dispersion is pumped through a 1-micron depth filter (absolute) and stored. The physical properties of the dispersion were measured to give a viscosity of 3.40 cP (measured at 25° C. at low shear (i.e. at 60 rpm) using a ThermoHaake Rheostress 1); pH 10.0 (measured at 25° C. using an WTW pH-Electrode Sen Tix 81); conductivity 3.0 mScm-1 (measured at 25° C. using a WTW Tetra-Con 325); particle size Z-average 128 nm (measured using a Malvern Zetasizer Nano-ZS); pigment solids content 14.70% w/w (measured using a Shimadzu UV-Vis recording Spectrophotometer—UV-2501 PC).

1b. Cyan Ink Set 1 (1.17% (poly(styrene-maleic acid) polymer solids, no additional polymer types): To a mechanically stirred tank or vessel using a saw tooth impellar is added 31.6 kg of the cyan dispersion (Example 1a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter. The physical properties of the ink were measured to give a viscosity of 5.60 cP (measured at 32° C. at low shear (i.e. at 60 rpm) using a Brookfield DV-II+ Viscometer); pH 10.22 (measured at 25° C. using an Oakton 510 series pH/conductivity meter); conductivity 0.259 mScm$^{-1}$ (measured at 25° C. using an Oakton 510 series pH/conductivity meter); dynamic surface tension (measured using a SITA bubble pressure tensiometer): 40.4 mNm$^{-1}$ (measured at 25° C. and 11 Hz), 34.9 mNm$^{-1}$ (measured at 25° C. and 2.7 Hz), 30.4 mNm$^{-1}$ (measured at 25° C. and 0.1 Hz) and 30.1 mNm-1 (measured at 25° C. and 0.025 Hz); particle size Z-average 119 nm, Dv50 98 nm, Dv90 218 nm, polydispersity index 0.196 (measured using a Malvern Zetasizer Nano-S); resolubility was measured using the test described below and found to be <1 minute.

1c. Cyan Ink Set 2 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 1000 A 6.25 kg (25% (poly(styrene-maleamic acid) polymer solution in water, acid number 465-500 mg KOH/g and molecular weight 5 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 8.69 cP (measured at 32° C. at low shear (i.e. 60 rpm) using a Brookfield DV-II+ Viscometer); pH 8.66 (measured at 25° C. using an Oakton 510 series pH/conductivity meter); conductivity 1.471 mScm$^{-1}$ (measured at 25° C. using an Oakton 510 series pH/conductivity meter); dynamic surface tension (measured using a SITA bubble pressure tensiometer) : 43.2 mNm$^{-1}$ (measured at 25° C. and 11 Hz), 36.4 mNm$^{-1}$ (measured at 25° C. and 2.7 Hz), 29.8 mNm$^{-1}$ (measured at 25° C. and 0.1 Hz), 29.4 mNm$^{-1}$ (measured at 25° C. and 0.025Hz); particle size Z-average 130 nm, Dv50 116 nm, Dv90 257 nm, polydispersity 0.206 (measured using a Malvern Zetasizer Nano-S); resolubility was measured using the test described below and found to be <1 minute.

1d. Cyan Ink Set 3 (2.85% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 2000A 6.25 kg (25% (poly(styrene-maleamic acid) solution in water, acid number 335-375 mg KOH/g and molecular weight 7 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 5.03 cP (measured at 25° C. at low shear (i.e. 60 rpm) using a Brookfield DV-II+ Viscometer); pH 8.72 (measured at 25° C. using an Oakton 510 series pH/conductivity meter); conductivity 0.989 mScm$^{-1}$ (measured at 25° C. using an Oakton 510 series pH/conductivity meter); dynamic surface tension (measured using a SITA bubble pressure tensiometer) : 39.8 mNm$^{-1}$ (measured at 25° C. and 11 Hz), 35.0 mNm$^{-1}$ (measured at 25° C. and 2.7 Hz), 31.6 mNm$^{-1}$ (measured at 25° C. and 0.1 Hz) and 31.4 (measured at 25° C. and 0.025 Hz); particle size Z-average 126 nm, Dv50 127 nm, Dv90 205 nm, polydispersity 0.204 (measured using a Malvern Zetasizer Nano-S); resolubility was measured using the test described below and found to be <1 minute.

1e. Cyan Ink Set 4 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 3000H, 6.25 kg (25% (poly(styrene-malameic acid) solution in water, acid number 255-305 mg KOH/g and molecular weight 10 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 4.22 cP (measured at 25° C. at low shear (i.e. at 60 rpm) using a Brookfield DV-II+ Viscometer); pH 9.70 (measured at 25° C. using an Oakton 510 series pH/conductivity meter); conductivity 1.102 mScm$^{-1}$ (measured at 25° C. using an Oakton 510 series pH/conductivity meter); dynamic surface tension (measured using a SITA bubble pressure tensiometer) : 45.9 mNm$^{-1}$ (measured at 25° C. and 11 Hz), 39.7 mNm$^{-1}$ (measured at 25° C. and 2.7 Hz), 34.6 mNm$^{-1}$ (measured at 25° C. and 0.1 Hz) and 34.2 mNm$^{-1}$ (measured at 25° C. and 0.025 Hz); particle size Z-average 123 nm, Dv50 145 nm, Dv90 243 nm, polydispersity 0.211 (measured using a Malvern Zetasizer Nano-S); resolubility was measured using the test described below and found to be <1 minute.

1f. Cyan Ink Set 5 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 3000 HNa, 6.25 kg (25% (poly(styrene-maleic acid) solution in water, acid number 255-305 mg KOH/g and molecular weight 10 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 7.76 cP (measured at 25° C. at low shear (i.e. at 60 rpm) using a Brookfield DV-II+ Viscometer); pH 10.27 (measured at 25° C. using an Oakton 510 series pH/conductivity meter); conductivity 2.24 mScm$^{-1}$ (measured at 25° C. using an Oakton 510 series pH/conductivity meter); dynamic surface tension (measured using a SITA bubble pressure tensiometer) : 54.2 mNm$^{-1}$ (measured at 25° C. and 8.1 Hz), 46.4 mNm$^{-1}$ (measured at 25° C. and 2.7 Hz), 36.2 mNm$^{-1}$ (measured at 25° C. and 0.1 Hz), 35.4 mNm-1 (measured at 25° C. and 0.025 Hz); particle size Z-average 127 nm, Dv50 106 nm, Dv90 268 nm, polydispersity 0.219 (measured using a Malvern Zetasizer Nano-S); resolubility was measured using the test described below and found to be <1 minute.

1g. Cyan Ink Set 6 (0.74% (poly(styrene-maleic acid) polymer solids+one additional non-SMA polymer–acrylic): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of Kordek MLX; 0.80 kg of Aerosol OT 70PG; 0.20 kg of Tego Foamex 1488; 1.00 kg of Tego Wet 280; 1.20 kg of Michem Lub 190; and 24.00 kg of Joncryl 8050-E (polyacrylic solution at 42% polymer solids in water; acid number 114 mg KOH/g and molecular weight >200 kD). The mixture is stirred until homogenous and then slowly added to a second vessel which is also mechanically stirred using a saw tooth impellar containing the Example 1a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.4 6cP (measured at 32° C. at low shear (i.e. 60 rpm) using a ThermoHaake Rheostress 1); pH 7.91 (measured at 25° C. using a WTW pH-Electrode SenTix 81); conductivity 4.43 mScm$^{-1}$ (measured at 25° C. using a WTW Tetra-Con 325); dynamic surface tension (all measured using a SITA bubble pressure tensiometer): 35.6 mNm$^{-1}$ (measured at 25° C. and 11 Hz), 29.3 mNm$^{-1}$ (measured at 25° C. and 2.7 Hz), 26.4 mNm$^{-1}$ (measured at 25° C. and 0.1 Hz); particle size Z-average 133 nm, Dv50 117 nm, Dv90 237 nm, Dv95 281 nm (measured using a Malvern Zetasizer Nano-ZS). Ink resolubilized in <2 hours.

Comparative Example 1. Cyan Ink (poly(styrene-maleic acid), additional polyurethane dispersion (PUD) and polyurethane polyol resin (PUD-OH)): To a mechanically stirred tank or vessel using a saw tooth impellar is added 20.0 g of the cyan dispersion (Example 1a); followed by deionised water, 30.34 kg; propylene glycol, 13.0 g; dipropylene glycol, 3.56 g; Michem Lube 190, 1.2 g; Hauthane L-2883 (PUD), 8.6 g; Tego Variplus DS50 (PUD-OH), 21.2 g; Sodium Docusate, 2 g; Kordek MLX 0.1 g. The mixture was stirred for a further 1 hour at ambient temperature and then the mixture filtered through a 1-micron absolute polypropylene spun depth filter to afford the finished ink. The physical properties of the ink were measured to give a viscosity of 3.70 cP (measured at 25° C. at low shear (i.e. at 60 rpm) using a Brookfield DV-II+ Viscometer); pH 9.06 (measured at 25° C. using an Oakton 510 series pH/conductivity meter); dynamic surface tension (measured using a SITA bubble pressure tensiometer): 35.6 mNm$^{-1}$ (measured at 25° C. and 11 Hz), 31.6 mNm$^{-1}$ (measured at 25° C. and 2.7 Hz), 29.2 mNm$^{-1}$ (measured at 25° C. and 0.1 Hz) particle size Z-average 115 nm, (measured using a Malvern Zetasizer Nano-S); resolubility was measured using the test described below and found to be completely non-resoluble.

Comparative Example 2. Cyan Ink (poly(styrene-maleic acid), additional polyacrylic dispersion): To a mechanically stirred tank or vessel using a saw tooth impellar is added 20.0 g of the cyan dispersion (Example 1a); followed by deionised water, 38.0 g; propylene glycol, 13.0 g; dipropylene glycol, 2.5 g; Joncryl 8050-E, 16.7 g; Joncryl 8055, 6.5 g; Michem Lube 190, 1.2 g; Acticide M10, 0.1 g; Tego Wet 280, 1.0 g; Tego Foamex 1488, 0.2 g; Aerosol OT 70 PG, 0.8 g. The mixture was stirred for a further 1 hour at ambient temperature and then the mixture filtered through a 1-micron absolute polypropylene spun depth filter to afford the finished ink. The physical properties of the ink were measured to give a viscosity of 3.86 cP (measured at 25° C. at low shear (i.e. at 60 rpm) using a Brookfield DV-II+ Viscometer); pH 8.19 (measured at 25° C. using an Oakton 510 series pH/conductivity meter); dynamic surface tension (measured using a SITA bubble pressure tensiometer): 26.7 mNm$^{-1}$ (measured at 25° C. and 0.1 Hz) particle size Z-average 128 nm, (measured using a Malvern Zetasizer Nano-S); resolubility was measured using the test described below and found to be completely non-resoluble.

Comparative Example 3. Cyan Ink (poly(styrene-maleic acid), additional polyurethane polyol resin (PUD-OH)): To a mechanically stirred tank or vessel using a saw tooth impellar is added 20.0 g of the cyan dispersion (Example 1a); followed by deionised water, 29.84 g; propylene glycol, 13.0 g; dipropylene glycol, 3.56 g; Michem Lube, 1.2 g; Kordek MLX, 0.1 g; Sodium docusate (surfactant), 2.0 g; Tego Variplus DS50, 30.3 g. The mixture was stirred for a further 1 hour at ambient temperature and then the mixture filtered through a 1-micron absolute polypropylene spun depth filter to afford the finished ink. The physical properties of the ink were measured to give a viscosity of 4.30 cP (measured at 25° C. at low shear (i.e. at 60 rpm) using a Brookfield DV-II+ Viscometer); pH 9.03 (measured at 25° C. using an Oakton 510 series pH/conductivity meter); dynamic surface tension (measured using a SITA bubble pressure tensiometer): 37.4 mNm$^{-1}$ (measured at 25° C. and 11 Hz), 31.9 mNm$^{-1}$ (measured at 25° C. and 2.7 Hz), 28.6 mNm$^{-1}$ (measured at 25° C. and 0.1 Hz) particle size Z-average 92 nm, (measured using a Malvern Zetasizer Nano-S); resolubility was measured using the test described below and found to be completely non-resoluble.

Example 2

Magenta Dispersion and Inks

2a. Dispersion (4.25% poly(styrene-maleic acid) polymer solids): To a mechanically stirred tank or vessel is added 51.75 kg of deionised water (conductivity less than 25 microSiemens) and 17.00 kg of Xiran 3000 HNa solution (25% (poly(styrene-maleic acid) solution in water; acid number 255-305 mg KOH/g and molecular weight 10 kD) and the two components mixing using stirring for a few minutes. Agitan 731 biocide (0.17 kg) and Acticide M10 biocide (0.09 kg) are then added with continual stirring of the mixture. The pigment powder, Cinquasia Pink K 4430 FP, 17.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 13.99 kg of deionised water is added. After mixing for a few minutes, the dispersion is pumped through a 1-micron depth filter (absolute) and stored. The physical properties of the dispersion were measured to give a viscosity of 3.60 cP (measured at 25° C. at low shear (i.e. at 60 rpm) using a ThermoHaake Rheostress 1); pH 9.9 (measured at 25° C. using a WTW pH-Electrode Sen Tix 81); conductivity 3.3 mScm$^{-1}$ (measured at 25° C. WTW Tetra-Con 325); particle size Z-average 127 nm (measured using a Malvern Zetasizer Nano-ZS); pigment solids content 17.0% w/w (measured using a Shimadzu UV-Vis recording Spectrophotometer—UV-2501 PC).

2b. Magenta Ink Set 1 (1.34% (poly(styrene-maleic acid) polymer solids, no additional polymer types): To a mechanically stirred tank or vessel using a saw tooth impellar is added 31.6 kg of the magenta dispersion (Example 2a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter. The physical properties of the ink were measured to give a viscosity of 5.52 cP (measured at 32° C. at low shear (i.e. at 60 rpm) using a Brookfield DV-II+ Viscometer); pH 10.13 (measured at 25° C. using an Oakton 510 series pH/conductivity meter); conductivity 0.305 mScm$^{-1}$ (measured at 25° C. using an Oakton 510 series pH/conductivity meter); dynamic surface tension (measured using a SITA bubble pressure tensiometer): 38.5 mNm$^{-1}$ (measured at 25° C. and 11 Hz), 33.4 mNm$^{-1}$ (measured at 25° C. and 2.7 Hz), 29.3 mNm$^{-1}$ (measured at 25° C. and 0.1 Hz), 29.1 mNm$^{-1}$ (measured at 25° C. and 0.025 Hz); particle size Z-average 126 nm, Dv50 108 nm, Dv90 3740 nm, polydispersity 0.255 (measured using a Malvern Zetasizer Nano-S); resolubility was measured using the test described below and found to be <1 minute.

2c. Magenta Ink Set 4 (2.82% (poly(styrene-maleic acid) polymer solids, no additional polymer types): To a mechanically stirred tank or vessel using a saw tooth impellar is added 29.6 kg of the magenta dispersion (Example 2a); followed by deionised water, 24.6 kg; propylene glycol, 32.55 kg; dipropylene glycol, 6.25 kg; Xiran 3000 H, 6.25 kg (poly(styrene-maleamic acid) 25% solution in water, acid number 255-305 mg KOH/g and molecular weight 10 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 4.33 cP (measured at 25° C. at low shear (i.e. at 60 rpm) using a Brookfield DV-II+ Viscometer); pH 9.57 (measured at 25° C. using an Oakton 510 series pH/conductivity meter); conductivity 1.131 mScm$^{-1}$ (measured at 25° C. using an Oakton 510 series pH/conductivity meter); dynamic surface tension (measured using a SITA bubble pressure tensiometer) : 45.4 mNm$^{-1}$ (measured at 25° C. and 11 Hz), 38.9 mNm$^{-1}$ (measured at 25° C. and 2.7 Hz), 33.5 mNm$^{-1}$ (measured at 25° C. and 0.1 Hz) and 33.0 mNm$^{-1}$ (measured at 25° C. and 0.025 Hz); particle size Z-average 122 nm, Dv50 147 nm, Dv90 3890 nm, polydispersity 0.239 (measured using a Malvern Zetasizer Nano-S); resolubility was measured using the test described below and found to be <1 minute.

2d. Magenta Ink Set 6 (0.85% (poly(styrene-maleic acid) polymer solids+one additional non-SMA polymer–acrylic): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of Kordek MLX; 0.80 kg of Aerosol OT 70 PG; 0.20 kg of Tego Foamex 1488; 1.00 kg of Tego Wet 280; 1.20 kg of Michem Lub 190; and 24.00 kg of Joncryl 8050-E. The mixture is stirred until homogenous and then slowly added to a second vessel which is also mechanically stirred using a saw tooth impellar containing Example 2a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.29 cP (measured at 32° C. at low shear (i.e. at 60 rpm) using a ThermoHaake Rheostress 1); pH 7.90 (measured at 25° C. using a WTW pH-Electrode SenTix 81); conductivity 4.42 mScm$^{-1}$ (measured at 25° C. using a WTW Tetra-Con 325); dynamic surface tension (all measured using a SITA bubble pressure tensiometer) : 34.5 mNm-1 (measured at 25° C. and 11 kHz), 28.9 mNm-1 (measured at 25° C. and 2.7 kHz), 26.1 mNm-1 (measured at 25° C. and 0.1 kHz); particle size Z-average 117 nm, Dv50 93 nm, Dv90 191 nm, Dv95 231 nm (measured using a Malvern Zetasizer Nano-ZS). Ink resolubilized in <2 hours.

Example 3

Yellow Dispersion and Inks

3a. Dispersion (4.63% poly(styrene-maleic acid) polymer solids): To a mechanically stirred tank or vessel is added 56.22 kg of deionised water (conductivity less than 25 microSiemens) and 18.50 kg of Xiran 3000 HNa solution (25% (poly(styrene-maleic acid) solution in water; acid number 255-305 mg KOH/g and molecular weight 10 kD) and the two components mixing using stirring for a few minutes. Agitan 731 biocide (0.19 kg) and Acticide M10 biocide (0.09 kg) are then added with continual stirring of the mixture. The pigment powder, Irgazin Yellow L 2040, 18.50 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 6.50 kg of deionised water is added. After mixing for a few minutes, the dispersion is pumped through a 1-micron depth filter (absolute) and stored. The physical properties of the dispersion were measured to give a viscosity of 4.20 cP (measured at 25° C. at low shear (i.e. at 60 rpm) using a ThermoHaake Rheostress 1); pH 8.9 (measured at 25° C. using a WTW pH-Electrode Sen Tix 81); conductivity 3.4 mScm$^{-1}$ (measured at 25° C. WTW Tetra-Con 325); particle size Z-average 146 nm (measured using a Malvern Zetasizer Nano-ZS); pigment solids content 18.0% w/w (measured using a Shimadzu UV-Vis recording Spectrophotometer—UV-2501 PC).

3b. Yellow Ink Set 1 (1.46% (poly(styrene-maleic acid) polymer solids, no additional polymer types): To a mechanically stirred tank or vessel using a saw tooth impellar is added 31.6 kg of the yellow dispersion (Example 3a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter. The physical properties of the ink were measured to give a viscosity of 6.08 cP (measured at 32° C. at low shear (i.e. at 60 rpm) using a Brookfield DV-II+ Viscometer); pH 6.72 (measured at 25° C. using an Oakton 510 series pH/conductivity meter); conductivity 0.159 mScm$^{-1}$ (measured at 25° C. using an Oakton 510 series pH/conductivity meter); dynamic surface tension (measured using a SITA bubble pressure tensiometer): 37.5 mNm$^{-1}$ (measured at 25° C. and 11 Hz), 31.8 mNm$^{-1}$ (measured at 25° C. and 2.7 Hz), 28.0 mNm$^{-1}$ (measured at 25° C. and 0.1 Hz), 27.6 mNm$^{-1}$ (measured at 25° C. and 0.025 Hz); particle size Z-average 122 nm, Dv50 1320 nm, Dv90 2140 nm, polydispersity 0.250 (measured using a Malvern Zetasizer Nano-S); resolubility was measured using the test described below and found to be <1 minute.

3c. Yellow Ink Set 4 (2.95% (poly(styrene-maleic acid) polymer solids, no additional polymer types): To a mechanically stirred tank or vessel using a saw tooth impellar is added 29.6 kg of the yellow dispersion (Example 3a); followed by deionised water, 24.6 kg; propylene glycol, 32.45 kg; dipropylene glycol, 6.3 kg; Xiran 3000 H, 6.3 kg (poly(styrene-maleamic acid) 25% solution in water, acid number 255-305 mg KOH/g and molecular weight 10 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 5.07 cP (measured at 25° C. at low shear (i.e. at 60 rpm) using a Brookfield DV-II+ Viscometer); pH 9.13 (measured at 25° C. using an Oakton 510 series pH/conductivity meter); conductivity 1.079 mScm$^{-1}$ (measured at 25° C. using an Oakton 510 series pH/conductivity meter); dynamic surface tension (measured using a SITA bubble pressure tensiometer): 45.2 mNm$^{-1}$ (measured at 25° C. and 11 Hz), 38.2 mNm$^{-1}$ (measured at 25° C. and 2.7 Hz), 32.7 mNm$^{-1}$ (measured at 25° C. and 0.1 Hz) and 32.2 mNm$^{-1}$ (measured at 25° C. and 0.025 Hz); particle size Z-average 128 nm, Dv50 165 nm, Dv90 2070 nm, polydispersity 0.240 (measured using a Malvern Zetasizer Nano-S); resolubility was measured using the test described below and found to be <1 minute.

3d. Yellow Ink Set 6 (0.93% (poly(styrene-maleic acid) polymer solids, one additional non SMA polymer): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of Kordek MLX; 0.80 kg of Aerosol OT 70 PG; 0.20 kg of Tego Foamex 1488; 1.00 kg of Tego Wet 280; 1.20 kg of Michem Lub 190; and 24.00 kg of Joncryl 8050-E. The mixture is stirred until homogenous and then slowly added to a second vessel which is also mechanically stirred using a saw tooth impeller containing the Example 3a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.71 cP (measured at 32° C. at low shear (i.e. at 60 rpm) using a ThermoHaake Rheostress 1); pH 7.86 (measured at 25° C. using a WTW pH-Electrode SenTix 81); conductivity 4.38 mScm-1 (measured at 25° C. using a WTW Tetra-Con 325); dynamic surface tension (all measured using a SITA bubble pressure tensiometer) : 34.7 mNm-1 (measured at 25° C. and 11 kHz), 29.1 mNm-1 (measured at 25° C. and 2.7 kHz), 25.6 mNm-1 (measured at 25° C. and 0.1 kHz); particle size Z-average 126 nm, Dv50 99 nm, Dv90 222 nm, Dv95 272 nm (measured using a Malvern Zetasizer Nano-ZS). Ink resolubilized in <2 hours.

Example 4

Black Dispersion and Ink

4a. Dispersion (3.5% poly(styrene-maleic acid) polymer solids): To a mechanically stirred tank or vessel is added 41.79 kg of deionised water (conductivity less than 25 microSiemens), and 14.00 kg of Xiran 3000 HNa solution (25% (poly(styrene-maleic acid) solution in water; acid number 255-305 mg KOH/g and molecular weight of 10 kD) and the two components mixing using stirring for a few minutes. Agitan 731 biocide (0.14 kg) and Acticide M10 biocide (0.07 kg) are then added with continual stirring of the mixture. The pigment powder, Raven FC1, 14.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 30.0 kg of deionised water is added. After mixing for a few minutes, the dispersion is pumped through a 1-micron depth filter (absolute) and stored. The physical properties of the dispersion were measured to give a viscosity of 3.50 cP (measured at 25° C. at low shear (i.e. at 60 rpm) using a ThermoHaake Rheostress 1); pH 9.0 (measured at 25° C. using a WTW pH-Electrode Sen Tix 81); conductivity 3.8 mScm$^{-1}$ (measured at 25° C. WTW Tetra-Con 325); particle size Z-average 140 nm (measured using a Malvern Zetasizer Nano-ZS); pigment solids content 14.0% w/w (measured using a Shimadzu UV-Vis recording Spectrophotometer—UV-2501 PC).

4b. Black Ink Set 1 (1.11% (poly(styrene-maleic acid) polymer solids, no additional polymer types): To a mechanically stirred tank or vessel using a saw tooth impellar is added 31.6 kg of the black dispersion (Example 4a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter. The physical properties of the ink were measured to give a viscosity of 5.63 cP (measured at 32° C. at low shear (i.e. at 60 rpm) using a Brookfield DV-II+ Viscometer); pH 9.33 (measured at 25° C. using an Oakton 510 series pH/conductivity meter); conductivity 0.327 mScm$^{-1}$ (measured at 25° C. using an Oakton 510 series pH/conductivity meter); dynamic surface tension (measured using a SITA bubble pressure tensiometer) : 37.4 mNm$^{-1}$ (measured at 25° C. and 11 Hz), 31.8 mNm$^{-1}$ (measured at 25° C. and 2.7 Hz), 28.6 mNm$^{-1}$ (measured at 25° C. and 0.1 Hz), 28.1 mNm$^{-1}$ (measured at 25° C. and 0.025 Hz); particle size Z-average 123 nm, Dv50 144 nm, Dv90 3890 nm, polydispersity 0.247 (measured using a Malvern Zetasizer Nano-S); resolubility was measured using the test described below and found to be <1 minute.

4c. Black Ink Set 4 (2.60% (poly(styrene-maleic acid) polymer solids, no additional polymer types): To a mechanically stirred tank or vessel using a saw tooth impellar is added 29.6 kg of the black dispersion (Example 4a); followed by deionised water, 24.6 kg; propylene glycol, 32.55 kg; dipropylene glycol, 6.25 kg; Xiran 3000 H, 6.25 kg ((poly(styrene-maleamic acid) 25% solution in water, acid number 255-305 mg KOH/g and molecular weight of 10 kD); and finally Tego Wet KL 245, 0.75 kg. The mixture was stirred for a further 1 hour at ambient temperature and then the mixture filtered through a 1-micron absolute polypropylene spun depth filter. The physical properties of the ink were measured to give a viscosity of 4.24 cP (measured at 25° C. at low shear (i.e. at 60 rpm) using a Brookfield DV-II+Viscometer); pH 9.49 (measured at 25° C. using an Oakton 510 series pH/conductivity meter); conductivity 1.178 mScm$^{-1}$ (measured at 25° C. using an Oakton 510 series pH/conductivity meter); dynamic surface tension (measured using a SITA bubble pressure tensiometer) : 45.3 mNm$^{-1}$ (measured at 25° C. and 11 Hz), 38.7 mNm$^{-1}$ (measured at 25° C. and 2.7 Hz), 33.3 mNm$^{-1}$ (measured at 25° C. and 0.1 Hz) and 32.7 mNm$^{-1}$ (measured at 25° C. and 0.025 Hz); particle size Z-average 131 nm, Dv50 113 nm, Dv90 232 nm, polydispersity 0.139 (measured using a Malvern Zetasizer Nano-S); resolubility was measured using the test described below and found to be <1 minute.

4d. Black Ink Set 6 (0.70% (poly(styrene-maleic acid) polymer solids, one additional non SMA polymer): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of Kordek MLX; 0.80 kg of Aerosol OT 70 PG; 0.20 kg of Tego Foamex 1488; 1.00 kg of Tego Wet 280; 1.20 kg of Michem Lub 190; and 24.00 kg of Joncryl 8050-E. The mixture is stirred until homogenous and then slowly added to a second vessel which is also mechanically stirred using a saw tooth impeller containing the Example 4a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.24 cP (measured at 32° C. at low shear (i.e. at 60 rpm) using a ThermoHaake Rheostress 1); pH 7.87 (measured at 25° C. using a WTW pH-Electrode SenTix 81); conductivity 4.46 mScm-1 (measured at 25° C. using a WTW Tetra-Con 325); dynamic surface tension (all measured using a SITA bubble pressure tensiometer) : 34.5 mNm-1 (measured at 25° C. and 11 kHz), 28.6 mNm-1 (measured at 25° C. and 2.7 kHz), 25.6 mNm-1 (measured at 25° C. and 0.1 kHz); particle size Z-average 141 nm, Dv50 126 nm, Dv90 237 nm, Dv95 27 6nm (measured using a Malvern Zetasizer Nano-ZS). Ink resolubilized in <2 hours.

All of the inventive Example 1b-1g; 2b-d; 3b-d; and 4b-d inks were tested for the following properties to show their suitability for use as inkjet inks:

1. Printing/Curing—Example 1b-1g; 2b-d; 3b-d; and 4b-d inks were printed using either a Dimatix DMP2800 printer, or industrial printing presses equipped with either Kyocera KJ4B or Konica Minolta 1024 print heads. All of the printed examples were independently either (a) dried at 40° C. in a convection fan oven for 30 minutes; (b) heat-dried at 110° C. for 2 minutes followed by curing at 210° C. for 10 minutes; or (c) cured using MR lamps from Adphos at a 3 kW setting. All printed examples were evaluated visually and demonstrated excellent line straightness, good uniform color density, no edge bleeding and minimal dot gain, and thus deemed to exhibit good jetting and printability properties. Substrates tested were glass microscope slide, protected steel; and chemically untreated PET polyester, BOPP and LDPE.

2. Resolubility (Examples 1b-1f; 2b-c; 3b-c; 4b-c inks)—A sample of each of the Example 1b-1f; 2b-c; 3b-c; 4b-c inks were coated on to a glass microscope slide (Fisher Scientific) using a 50-micron No. 5 K-bar (also known as a wire bar coater) and the film dried at 40° C. for 30 minutes in a fan convection oven. Subsequently, the printed substrate was partially immersed in a beaker containing flush (inkjet flush liquid) and the time taken for the ink to resolubilize from the substrate was recorded. For this test, the time to resolubilize is preferably <2 hours, more preferably <1 hour, more preferably <30 min., most preferably <10 min. In all cases, the inks resolubilized in <1 minute, which is an excellent result. This test is an accurate representation of what might happen to an inkjet print head if it is not capped correctly and is left for a long period of time with the end result being the ink drying in the print head or the machine. The expectation is that the ink should be resolubilized as quickly as possible with no visible or lasting damage to the print head or machine.

3. Resolubility (Examples 1g; 2d; 3d; 4d inks)—These inks all contain the additional polymer, which lengthened the time for resolubility. Also, a slightly different test method was used. Weigh 0.065 g ink on a glass microscope slide; dry at room temperature for 1 hour; immerse in a beaker containing flush (inkjet flush liquid); agitate; the time taken for the ink to resolubilize from the substrate was recorded. For this test, the time to resolubilize is preferably <2 hours. All of the Examples 1g; 2d; 3d; 4d inks resolubilized in <2 hours.

4. Storage stability—All of the Example 1b-1g; 2b-d; 3b-d; and 4b-d inks were tested for storage stability by storing the ink samples in glass vials (30 mL) for periods of time at 50° C. The physical properties listed in the examples were measured on a weekly basis. If one of the parameters from viscosity, filter time, surface tension, pH or conductivity has changed by more than +/−10% over the course of 2 weeks, then the ink is deemed to have failed. Example 1b-1g; 2b-d; 3b-d; and 4b-d inks all showed acceptable stability (no change of +/−10% for the aforementioned properties) after two weeks at 50° C. This equates to a product shelf-life of approximately 16 weeks at normal storage conditions (15-30° C.).

5. Open time—An 8 mL Dimatix DoD ink cartridge was filled by syringe and loaded onto the Dimatix DMP2800 printer. The ink was left in the cartridge for at least one hour and then the printer re-started. For the ink to pass, a fully printed image was expected to appear. Indeed, with all of the Example 1b-1g; 2b-d; 3b-d; and 4b-d inks, this was the case. Further, the open time was tested on Kyocera KJ4B and Konica Minolta 1024 print heads for all of the 1b-1g; 2b-d; 3b-d; and 4b-d inks and found to be in excess of 1 hour. For this test standard photographic quality A4 inkjet paper was used.

6. Cross hatch and crock test (adhesion and bend)—Testing was performed on protected steel and chemically untreated PET polyester, BOPP, LDPE substrates. The ink is applied to each substrate using a 12-micron No. 2 K-bar (also known as a wire bar coater) and the film dried at 110° C. for 2 minutes in fan oven. The sample is tested for scratch resistance using a fingernail. If no ink coating is visually removed, then the coating is a pass. The film is then cured in a convection oven for 10 minutes at 210° C. to ensure a full cure on a metal substrate. The bend test involves bending the substrate through 180 degrees and checking if there is any visible damage to the dried film by eye. If there is no damage, it is a pass. A cross-hatch test is then performed by using a scribe cross hatch (10×10 cross hatch). The print surface is wiped with a low friction contact brush and a strip of Elcometer 99 tape is applied to the cross-hatch area and rubbed several times under pressure to ensure the tape is adhered to the surface. The tape end is bent over by 180 degrees and the tape end pulled to establish if any of the coating is removed. If any coating is removed, this is a fail. The films are also swabbed with deionized water up to 100 times by manual contact swabbing. A pass is at least 100 wipes. All of the Example 1b-1g; 2b-d; 3b-d; and 4b-d inks passed all of these tests on all substrates.

The rub fastness of Comparative Example 1 was measured using a standard crock meter and dry rub was found to be more than 200 rubs, which is considered good. Water rub fastness was also very good. However, the scratch test for comparative example 1 showed 30% removal. Therefore, it can be concluded from this comparative example that using a pol(styrene-maleic acid) co-polymer as a dispersant and co-binder, in combination with a PUD and PUD-OH dispersion as co-binders, gives very poor resolubility, but good water rub test result.

The rub fastness of Comparative Example 2 was measured using a standard crock meter and dry rub was found to be more than 50 rubs, which is considered as poor. Water rub fastness was very poor with 100% being removed very quickly. Therefore, it can be concluded from this comparative example that using a pol(styrene-maleic acid) co-polymer as a dispersant and co-binder, in combination with two additional polyacrylic resins as co-binders, gives very poor resolubility and very poor water rub test result.

The rub fastness of Comparative Example 3 was measured using a standard crock meter and dry rub was found to be very poor, about 10 rubs. Water rub fastness was adequate 50% being removed after 100 rubs. Therefore, it can be concluded from this comparative example that using a pol(styrene-maleic acid) co-polymer as a dispersant and co-binder, in combination with a single PUD-OH as co-binder, gives very poor resolubility, but adequate water rub test result.

Definitions

Good jetting and printed image quality are defined as adequate drop formation when ejected from a digital inkjet head at different drop volumes. There should be no satellites or drop break up which can be detrimental to the printed image quality, usually verified by jet testing on a drop watcher machine such as those from X-Rite. Good printed image quality is defined as the image being compliant with the end use application. Usually verified using a series of tests such as line straightness, wicking, feathering, dot gain, etc. on an ImageXpert from Xrite.

Storage stability is the number of days, weeks or months that an ink can be stored without any significant settling or degradation which may lead to poorer performance of the inks.

Open time is the time by which a print head can be left uncapped (hence open) and then when jetting is recommenced, a complete start-up of all nozzles. Normal open times are at least one hour.

Resolubility is defined as the time taken to resolubilise ink which has air dried in a digital print head or press due to poor maintenance or downtime. The expectation is that when using a standard flush, cleaning or maintenance liquid, the ink is resolubilised in less than 10 minutes, thus enabling blocked nozzles to be recovered.

Robust film forming properties are verified using the standard cross hatch test (ISO 2409 and ASTM D 3359-17), physical rub tests (ISO 105 X12:2016 and ASTM D 5264-98(2019)), and a mandrel bend test by bending the substrate (ASTM D522/D522M-17). All of the 1b-1g; 2b-d; 3b-d; and 4b-d inks passed for these properties.

The exemplary inks described above can be divided into 5 categories as follows:

Ink set 1, which include only Xiran 3000 HNa (examples 1b, 1f, 2b, 3b and 4b)

Ink set 2, which include Xiran 3000 HNa and Xiran 1000A (example 1c)

Ink set 3, which include Xiran 3000 HNa and Xiran 2000A (example 1d)

Ink set 4, which include Xiran 3000 HNa and Xiran 3000H (examples 1e, 2c, 3c and 4c)

Ink set 5, which include Xiran HNa and Joncryl 8050-E (examples 1g, 2d, 3d and 4d)

All of the ink sets passed the resolubility test with ink sets 1-4 all demonstrating excellent resolubility (i.e. the time taken for the ink to resolubilize was <1 minute) and ink set 5 demonstrating acceptable resolubility (i.e. the time taken for the ink to resolubilize was <2 hours). Thus, the inks containing a single polymer type have improved resolubility compared to those containing an additional non-SMA type co-polymer.

All of the ink sets passed the rub test with ink set 1 demonstrating good rub fastness; ink sets 2 and 3 demonstrating excellent rub fastness; and ink sets 4 and 5 demonstrating acceptable rub fastness. Thus, the ink sets containing a second poly(styrene-maleamic acid) co-polymer AMP salt have improved rub fastness compared to those containing a single poly(styrene-maleic acid) co-polymer sodium salt and those containing a poly(styrene-maleic acid) co-polymer sodium salt together with a poly(styrene-maleamic acid) co-polymer ammonium salt. Furthermore, the addition of a second non-SMA polymer did not achieve the same improvement in rub fastness as the addition of a second SMA polymer.

The invention claimed is:

1. A printing ink composition comprising a polymer selected from a poly(styrene-maleic acid) co-polymer having an acid number of ≥255 mg KOH/g, a poly(styrene-maleamic acid) co-polymer having an acid number of ≥255 mg KOH/g or a combination thereof, wherein the co-polymer is a lithium, sodium, potassium, ammonium or quaternary ammonium salt, or combinations thereof, wherein the composition comprises 0.1-5% poly(styrene-maleic acid) co-polymer solids or poly(styrene-maleamic acid) co-polymer solids, and wherein the composition does not include glycerol.

2. The composition of claim 1 further comprising one or more colorants;
water; and at least one organic co-solvent, preferably, the one or more colorants is an inorganic or organic pigment.

3. The composition of claim 2, which is an inkjet ink suitable for deposition through at least a single nozzle.

4. The composition of claim 3 wherein the maleic acid or maleamic acid repeating unit in the polymer is a mono-sodium salt, a di-sodium salt, a mono-ammonium salt, a di-ammonium salt, a mono-quaternary ammonium salt or a di-quaternary ammonium salt.

5. The composition of claim 3 wherein the quaternary ammonium salt is a quaternary ammonium salt of an organic amine wherein the organic amine is selected from the group consisting of primary, secondary and tertiary aliphatic amines, or hydroxyl—or alkoxyl amines and combinations thereof, preferably wherein the organic amine is a hydroxyl amine, preferably aminoethyl propanol or dimethylethanolamine.

6. The composition of claim 5, wherein the acid number of the polymer is 255-550 mg KOH/g.

7. The composition of claim 6, wherein the molecular weight of the polymer is 3,000-20,000 Daltons, preferably 3,500-15,000 Daltons.

8. The composition of claim 7 wherein the composition comprises a single polymer type that is poly(styrene-maleic acid) co-polymer and/or poly(styrene-maleamic acid) co-polymer.

9. The composition of claim 8 wherein the poly(styrene-maleic acid) co-polymer or poly(styrene-maleamic acid) co-polymer does not contain any maleic anhydride residues.

10. The composition of claim 9 wherein the composition does not include a polyurethane.

11. The composition of claim 10, comprising 0.1-7.5 wt % of a pigment, 0.1-5 wt % of a styrene-maleic acid co-polymer, 2-30 wt % of an organic solvent and the remainder of the formulation deionised water.

12. The composition of claim 10, comprising 0.1-7.5 wt % of a pigment, 0.1-5 wt % of a styrene-maleamic acid co-polymer, 2-30 wt % of an organic solvent and the remainder of the formulation deionised water.

13. The composition of claim 2 wherein the at least one organic solvent is selected from an alcohol, a polyol, a ketone, a ketone alcohol, an ether, ethers of a polyhydrilic alcohol or a combination thereof, preferably wherein the at least one organic solvent is a polyol selected from propylene glycol, dipropylene glycol or a combination thereof.

14. The composition of claim 13, wherein the poly(styrene-maleic acid) co-polymer or poly(styrene-maleamic acid) co-polymer is dispersant, surfactant and binder, preferably wherein the composition contains no other component(s) which perform the function of any one or more of dispersant, surfactant and binder.

15. A printed film comprising or derived from the composition of claim 1.

16. The printed film of claim 15 which is compliant with use in food contact and pharmaceutical foil applications.

17. A method for printing, comprising applying the composition of claim 1 onto a substrate and curing.

18. The method of claim 17, wherein the method of printing is inkjet.

19. A method of printing an image on a non-porous substrate by inkjet printing, wherein said method comprises applying a water-based inkjet ink composition onto a non-porous substrate, wherein said inkjet ink composition comprises a poly(styrene-maleic acid) co-polymer having an acid number of ≥255 mg KOH/g and/or a poly(styrene-maleamic acid) co-polymer having an acid number of ≥255 mg KOH/g, wherein the composition comprises 0.1-5% poly(styrene-maleic acid) co-polymer solids or poly(styrene-maleamic acid) co-polymer solids, and wherein the composition does not include glycerol.

20. The method of claim 18, wherein the substrate is selected from the group consisting of BOPP (Biaxially Oriented PolyPropylene), Cellophane (cellulose), LDPE/HDPE (low and high density polyethylenes), OPP (Orientated polypropylene), MET-OPP (Metalized Orientated Polypropylene) PA (polyamide, Nylon), PET (Polyethylene Terephthalate), MET-PET (Metalized Polyethylene Terephthalate), PP (polypropylene), aluminium foil, aluminium pharmaceutical foil, steels, copper, protected metals and PVC (Polyvinyl Chloride).

21. The method of claim 20, wherein the substrates do not contain a chemical primer or chemical pre-treatment layer.

\* \* \* \* \*